July 14, 1964 R. B. COTTON 3,140,845
CROSS DECK OR RUNWAY PENDANT
Filed Aug. 2, 1962

INVENTOR
Robert B. Cotton

BY *Herbert M. Birch*
ATTORNEY

United States Patent Office 3,140,845
Patented July 14, 1964

3,140,845
CROSS DECK OR RUNWAY PENDANT
Robert B. Cotton, Media, Pa., assignor to All American Engineering Company, Wilmington, Del., a corporation of Delaware
Filed Aug. 2, 1962, Ser. No. 214,415
5 Claims. (Cl. 244—110)

My present invention relates generally to improvements in aircraft arresting gear wherein an arresting hook carried by an aircraft to be arrested engages with a cross deck or runway pendant, which is usually formed of wear and abrasion resistant steel cable or webbing connected between purchase cables leading around a sheave at each side of the runway.

When the arresting hook of an airplane engages the cross deck or runway pendant, a small V-shaped kink is formed. This kink gets progressively larger as the motion in the arrest-pendant develops, such motion being generally referred to as a transverse wave, which travels to the deck sheaves on each side of the runway at a speed dependent on the aircraft's engaging velocity. Then at the same instant, the engaging hook creates a longitudinal stress wave in the cable itself which travels to the arresting engine and returns towards the hook so quickly that it may overtake the slower moving transverse wave. If the two cable stress waves should happen to collide at the deck sheaves, for example, very high peak tensions are created in the cable which may cause the same to break. Loads may also in such event be retransmitted to the aircraft and arresting engine with adverse effects.

An object of this invention is to correct the foregoing problems by providing a combination of steel and synthetic plastic material in the arresting cross deck or runway pendant.

Another object is to provide in a novel cross deck or runway pendant a synthetic plastic material, such as nylon rope or nylon tape, whereby the peak loads exerted on an airplane or object being arrested are reduced by the energy absorbing property of the synthetic plastic.

Yet another object is to provide as an article of manufacture a cross deck or runway arresting pendant formed of a section steel cable or webbing and sections of a shock absorbing synthetic plastic material adapted for connection at each end to a purchase cable from an arresting engine or the like.

With the foregoing and other objects in view, the present invention consists of certain novel features of construction, combination and arrangement of parts, as will now be more fully described and particularly defined in the appended claims.

In the drawings, wherein like parts are given like reference numerals and are thus identified throughout the following description.

Figures 1, 2:
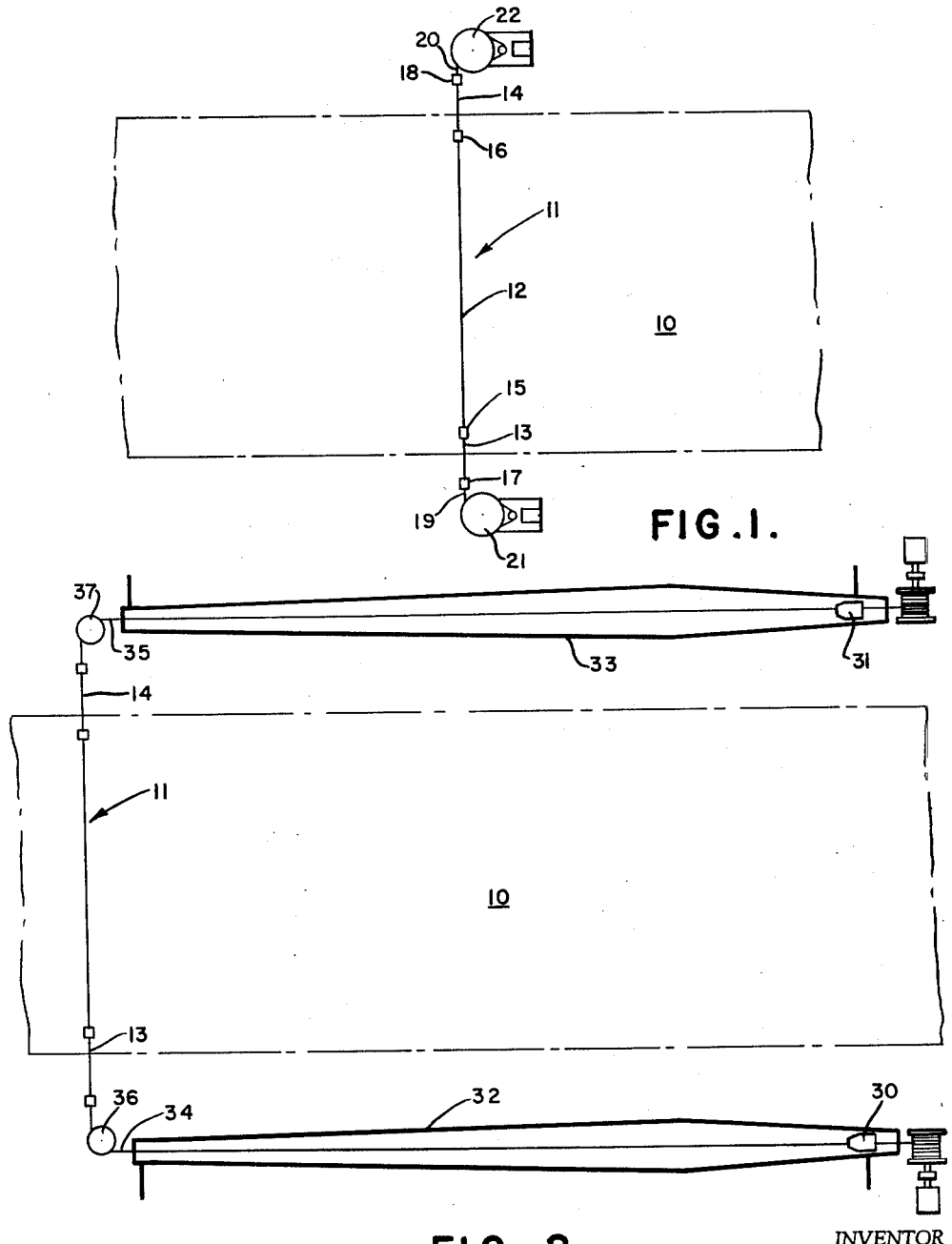
FIGURE 1 is a top plan view of semi-schematic nature showing my novel cross deck or runway pendant connected between the purchase cables of spaced apart arresting engines of the rotary type without the use of sheaves on each side of the deck or runway.
FIGURE 2 is a similar view to FIGURE 1 showing my novel cross deck or runway pendant connected by suitable in line cable connectors to the purchase cables from another type of aircraft arresting engine showing the same between deck sheaves on each side of the deck or runway.

Referring in detail to the drawings and first with particular reference to FIGURE 1, there is illustrated a deck or runway surface 10 across which extends a cross deck or runway pendant 11. The pendant 11 is formed of sections comprising a steel cable or web 12 and end elongated synthetic plastic links, such as nylon ropes or tapes 13 and 14, respectively.

Each respective section 13 and 14 is connected to an opposite end of the steel cable or web 12 by any suitable type of in line connector generally numbered 15 and 16, while the respective opposite end of each synthetic link is connected by any suitable type of in line connector 17 and 18, respectively, to the end of a respective purchase cable 19 and 20. These purchase cables may be nylon rope or nylon tape and reel off of drums 21 and 22 of aircraft arresting engines supported at each side of the deck or runway. The arresting engines may be of the type illustrated and described in co-pending application Serial Number 201,933, filed June 12, 1962 by Charles J. Daniels, Howard S. Green and Meridith C. Wardle and assigned to the same assignee to which this invention is assigned.

The pendant 11 may be engaged from either direction along the deck or runway 10 by the hook of a landing aircraft. When the arresting load is thus applied to the deck pendant 11 any transverse stresses developed in the cable leading to the arresting engines or aircraft are damped out by the presence of the respective shock absorbing synthetic links 13 and 14.

In reference to FIGURE 2 of the drawings, the same cross deck or runway surface pendant 11 is shown. However, in this figure the pendant 11 is illustrated as being connected between the ends of purchase cables 34 and 35. These purchase cables each payout from a piston 30 and 31, respectively, in the respective tubes 32 and 33 of another type of arresting engine, such as illustrated, described and claimed in Patent No. 2,777,653, issued January 5, 1957, which is likewise assigned to the present assignee of the present invention.

In this arrangement the purchase cables 34 and 35 pass over sheaves 36 and 37 to each side of the deck or runway surface and then are coupled to the shock damping and absorbing synthetic plastic links 13 and 14 of the pendant 11. In this instance when an arresting load is on the pendant, the links damp out the stress waves set up in the central steel cable or web portion of the pendant and prevent and/or eliminate return wave collisions in the steel cable, tape or web, which often results in cable rupture.

Thus I have provided a novel compound arrest pendant with a durable wear resistant aircraft hook engaging portion and with shock absorbing and vibration damping portions which provide for greater durability in the wear resistant portion of the pendant and which also protect the aircraft, arrest engines and the associated deck mounts, such as sheaves or the like from damage.

While the invention has been described in accordance with certain specific uses thereof for only one actual embodiment, such uses and apparatus illustrated with my novel arresting pendant are to be considered illustrative only and not restrictive, the scope of the invention being defined in the subjoined claims.

What I claim is:

1. A sectional aircraft arrest hook cable comprising a center wear resistant section of cable for aircraft arrest hook engagement, and shock absorbing sections of synthetic plastic coupled to each opposite end of said center section, and coupling means for connection of said sections of synthetic plastic with the purchase cables of aircraft arrest means.

2. An aircraft arrest pendant as described in claim 1, wherein said center section is a steel cable.

3. An aircraft arrest pendant as described in claim 1, wherein said shock absorbing means are nylon ropes.

4. An aircraft arrest pendant as described in claim 1, wherein said shock absorbing means are nylon tapes.

5. A sectional aircraft arrest pendant comprising a center wear resistant section of cable for aircraft arrest hook engagement, and shock absorbing sections of nylon coupled to each opposite end of said center section and coupling means for connection of said sections of nylon with the purchase cables of aircraft arrest means; wherein said shock absorber means are formed of nylon members and interconnect said center wear resistant section with the free ends of arresting engine purchase cables; and wherein each purchase cable of each arrest engine pass over sheaves on each side of a runway across which said pendant extends, whereby the ends of each of the purchase cables connect by said coupling means to said nylon sections between said sheaves.

References Cited in the file of this patent

UNITED STATES PATENTS

| | | |
|---|---|---|
| 2,465,936 | Schultz | Mar. 29, 1949 |
| 2,977,076 | Byrne | Mar. 28, 1961 |
| 2,987,278 | Hoffman | June 6, 1961 |
| 3,098,629 | Fonden et al. | July 23, 1963 |